United States Patent
Yu et al.

(10) Patent No.: US 12,481,946 B2
(45) Date of Patent: Nov. 25, 2025

(54) RESOURCE PROVISIONING BY A REINFORCEMENT LEARNING FRAMEWORK USING GUIDED ORDERING OF SERVICES

(71) Applicant: Adobe Inc., San Jose, CA (US)

(72) Inventors: Tong Yu, San Jose, CA (US); Kanak Mahadik, San Jose, CA (US)

(73) Assignee: ADOBE INC., San Jose, CA (US)

( * ) Notice: Subject to any disclaimer, the term of this patent is extended or adjusted under 35 U.S.C. 154(b) by 221 days.

(21) Appl. No.: 18/120,088

(22) Filed: Mar. 10, 2023

(65) Prior Publication Data
US 2024/0303569 A1 Sep. 12, 2024

(51) Int. Cl.
*G06Q 10/0631* (2023.01)
*G06N 20/00* (2019.01)

(52) U.S. Cl.
CPC ....... *G06Q 10/06316* (2013.01); *G06N 20/00* (2019.01)

(58) Field of Classification Search
CPC ........... G06Q 10/06316; G06F 11/3051; G06F 11/3433; H04L 47/805; H04L 41/0803; H04L 41/14; H04L 41/821; H04L 41/0894; H04L 41/0897; H04L 41/0896; H04L 41/0806; H04L 41/5051; H04L 5/0032; H04L 47/76
See application file for complete search history.

(56) References Cited

U.S. PATENT DOCUMENTS

| | | | |
|---|---|---|---|
| 9,716,617 B1 * | 7/2017 | Ahuja | H04L 67/1001 |
| 10,069,759 B1 * | 9/2018 | Vadera | G06N 5/04 |
| 10,089,144 B1 * | 10/2018 | Nagpal | G06F 16/2455 |
| 10,122,610 B2 * | 11/2018 | Kumar | H04L 43/16 |
| 10,355,922 B1 * | 7/2019 | Stienhans | H04L 43/55 |
| 10,484,301 B1 * | 11/2019 | Shukla | G06F 3/0605 |
| 10,761,897 B2 * | 9/2020 | LaBute | G06N 3/08 |

(Continued)

OTHER PUBLICATIONS

Alipour, Hanieh et al., Online Machine Learning for Cloud Resource Provision of Microservice Backend Systems 2017 IEEE International Conference on Big Data, 2017 (Year: 2017).*

(Continued)

*Primary Examiner* — Scott L Jarrett
(74) *Attorney, Agent, or Firm* — Shook Hardy & Bacon L.L.P.

(57) ABSTRACT

Embodiments of the present disclosure provide systems, methods, and computer storage media for resource provisioning of microservices using guided order of learning in a reinforcement learning framework. In embodiments, service resource information relating to microservices operating in a computing environment is received and used to perform a similarity analysis to generate similarity scores for each of the services. The service resource information is ordered based on a closeness between the similarity scores of the services. The ordered service resource information is inputted into a reinforcement learning agent to generate a resource configuration determination of at least one service of the services. The resource configuration determination is then provided to a provisioning component associated with the computing environment for provisioning the microservice.

20 Claims, 7 Drawing Sheets

(56) References Cited

U.S. PATENT DOCUMENTS

| | | | |
|---|---|---|---|
| 10,812,333 B2* | 10/2020 | Li | H04L 67/60 |
| 10,949,261 B2* | 3/2021 | Yang | G06F 9/4881 |
| 11,115,268 B2* | 9/2021 | Yuan | H04L 67/306 |
| 11,170,445 B2* | 11/2021 | Irwin | G16H 40/63 |
| 11,178,065 B2* | 11/2021 | Ignatyev | H04L 41/14 |
| 11,281,499 B2* | 3/2022 | Bartfai-Walcott | H04L 67/10 |
| 11,489,749 B2* | 11/2022 | Samadi | H04L 43/062 |
| 11,620,162 B2* | 4/2023 | Chen | G06N 20/00 709/223 |
| 11,637,889 B2* | 4/2023 | Vyas | G06F 9/45558 709/220 |
| 11,663,047 B2* | 5/2023 | Bartfai-Walcott | H04L 67/12 709/223 |
| 11,663,524 B2* | 5/2023 | Bikumala | G06N 3/088 706/12 |
| 11,693,766 B2* | 7/2023 | Jansen | G06F 11/302 717/124 |
| 11,861,406 B2* | 1/2024 | Desai | G06F 21/602 |
| 11,902,177 B1* | 2/2024 | Chakravarty | H04L 43/16 |
| 11,902,390 B2* | 2/2024 | Banerjee | H04L 41/0806 |
| 11,995,559 B2* | 5/2024 | Qiu | G06N 3/126 |
| 12,147,838 B1* | 11/2024 | Wellum | G06F 9/455 |
| 2017/0177808 A1* | 6/2017 | Irwin | G16H 40/63 |
| 2019/0102155 A1* | 4/2019 | Garvey | G06F 8/60 |
| 2019/0215239 A1* | 7/2019 | Li | H04L 41/0823 |
| 2019/0243691 A1* | 8/2019 | LaBute | G06N 3/08 |
| 2020/0050494 A1* | 2/2020 | Bartfai-Walcott | G06F 9/5061 |
| 2020/0403888 A1* | 12/2020 | Selvaraj | H04L 41/0806 |
| 2021/0311798 A1* | 10/2021 | Desai | G06F 21/72 |
| 2021/0344582 A1* | 11/2021 | Samadi | H04L 41/145 |
| 2022/0036418 A1* | 2/2022 | Bikumala | H04L 41/5041 |
| 2022/0180178 A1* | 6/2022 | Tasinga | G06F 9/5011 |
| 2022/0374274 A1* | 11/2022 | Chen | G06F 11/3409 |
| 2022/0374281 A1* | 11/2022 | Ramtekkar | G06F 9/5005 |
| 2022/0398189 A1* | 12/2022 | Jansen | G06F 9/5011 |
| 2023/0164049 A1* | 5/2023 | Samadi | H04W 16/22 |
| 2024/0176674 A1* | 5/2024 | Khanna | G06F 9/5077 |

OTHER PUBLICATIONS

Yu, Guangba et al., Microscaler: Automatic Scaling for Microservices with an Online Learning AApproach 2018 IEEE International Conference on Web Services, 2019 (Year: 2019).*

Rossi, Fabiana et al., Horizontal and Vertical Scaling of Container-based Applications using Reinforcement Learning 2019 IEEE 12 International Conference on Cloud Computing, 2019 (Year: 2019).*

Xu, Minxian et al., CoScal: Multifacted Scaling of Microservices with Reinforcement Learning IEEE Transactions on Network and Service Management, vol. 19, No. 4, Dec. 2022 (Year: 2022).*

Thananjeyan, Brijen et al., Resource Allocation in Multi-Armed Bandit Exploration: Overcoming Sublinear Scaling with Adaptive Parallelism, Proceedings of the 38 th International Conference on Machine Learning, PMLR 139, 2021 (Year: 2021).*

* cited by examiner

RESOURCE PROVISIONING BY A REINFORCEMENT LEARNING FRAMEWORK USING GUIDED ORDERING OF SERVICES

BACKGROUND

Many enterprises have embraced containerization and microservice architecture, where multitudinous services are developed and deployed to enable rapid development and deployment of applications. With containerization, computer program code can be developed and packaged in portable containers to different platforms that manage and run the containers. As such, containerization permits faster software development for a program deployed on multiple different platforms that would otherwise require separate source branches or forks or at least different compilation and execution environments.

The word "microservices" describes a modular way to architect applications so that they are split into independent units (i.e., "services") which communicate through application programming interfaces (APIs) and well-defined interfaces. The microservices typically specify the number of resources required to be provisioned for them. Due to various circumstances, the usage of resources can either increase or decrease based on the demands placed upon the services.

SUMMARY

Introduced here are techniques/technologies that use a reinforcement learning framework for resource provisioning microservices operating in a computing environment. The reinforcement learning framework learns in a sample-efficient manner using a guided order of learning technique. The guided order of learning technique organizes microservices based on a similarity analysis performed on each microservice. Based on the analysis, the guided order of learning reorders the microservices such that adjacent microservices are as similar as possible. The reordered microservices are then provided to a reinforcement learning agent for determining resource configurations for the microservices in operation. This allows for sample-efficient learning in environments with a large number of microservices in operation.

Embodiments of the present disclosure are directed to providing mechanisms, including computer-implemented methods and non-transitory computer storage media for resource provisioning of microservices using guided order of learning in a reinforcement learning framework. In some embodiments, service resource information relating to microservices operating in a computing environment is received and used to perform similarity analyses that generate similarity scores for each of the microservices. The similarity analyses can be based on, for instance, Central Processing Unit (CPU) usage metrics using CPU usage signals in a time-domain and a CPU usage signals in a frequency domain. The service resource information is then ordered based on the closeness between the similarity scores of the microservices. The ordered service resource information is then inputted into a reinforcement learning agent to generate a resource configuration determination of at least one microservice of the microservices. In some implementations, the reinforcement learning agent is a multi-armed bandit agent where predefined resource configurations serve as the arms of the multi-armed bandit agent. The resource configuration determination is then provided to a provisioning component associated with the computing environment for provisioning the at least one microservice.

By ordering the service resource information based on microservice similarity, the ordering improves and optimizes the learning process to allow the reinforcement learning agent to provide optimal resource configuration determinations. When a resource configuration determination is produced, the resulting configuration can be applied to a microservice to minimize resource wastage while also optimizing microservice performance. For example, a resource configuration determination can be provided at an interval to modify the resource usage of a microservice based on user demand at any given time.

This summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the embodiments of the disclosure will become better understood with regard to the following description, appended claims, and accompanying drawings where:

Figure 1:
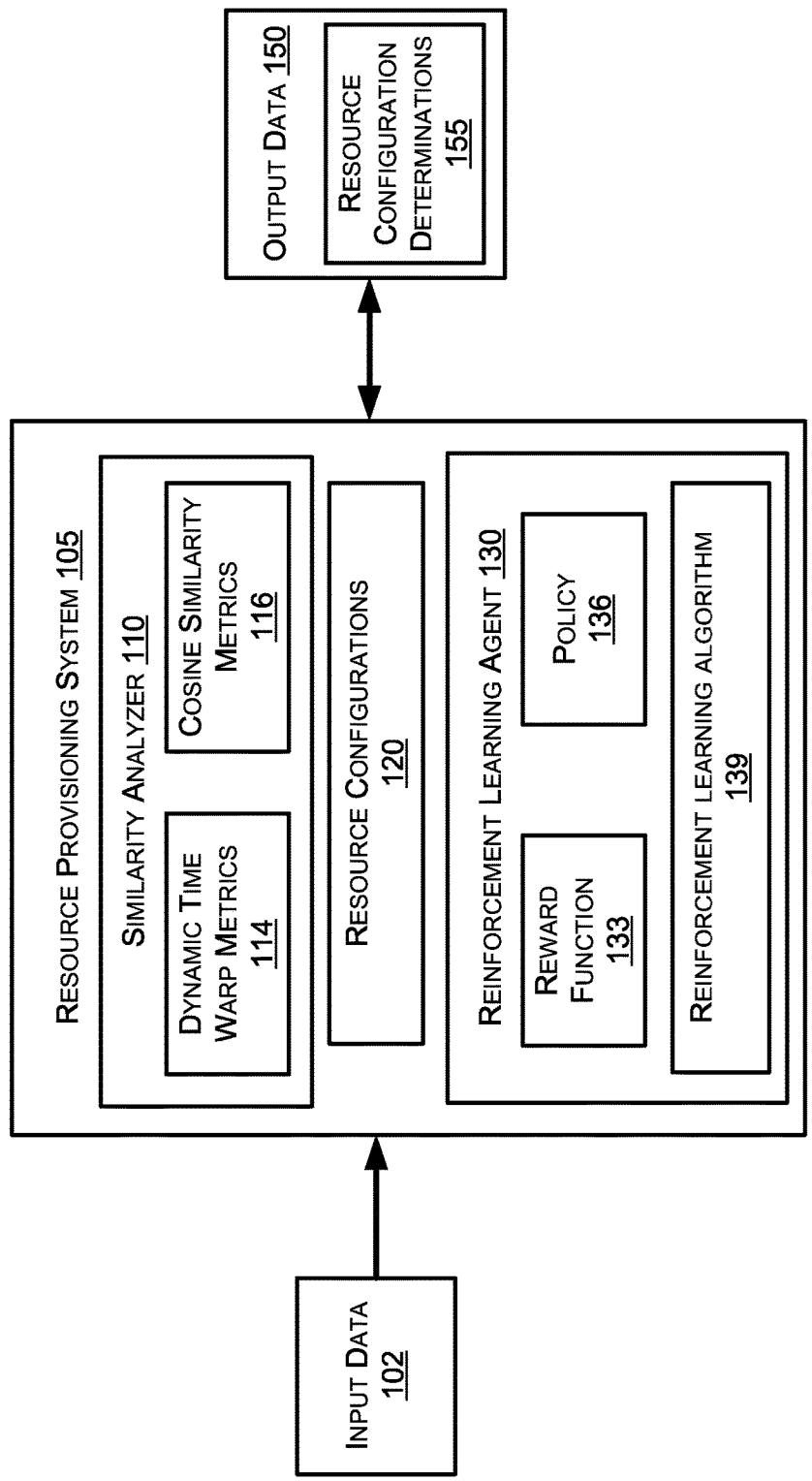
FIG. 1 is a block diagram of an architecture for a reinforcement learning framework, in accordance with embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

Overview

The present disclosure relates to resource provisioning and, more specifically, to resource provisioning of microservices using guided order of learning in a reinforcement learning framework. While the present disclosure is not necessarily limited to such applications, various aspects of the disclosure can be appreciated through a discussion of various examples using this context.

Traditional infrastructure management, such as using bare metal systems or virtual machines running inside a data center, is a slow, manual process that cannot keep up with the infrastructure demands of today's network-run applications and microservices. Under traditional management systems, consumers file tickets with the provider, and a microservice provider at the other end of the request manages the request by logging into a management portal or console, pointing and clicking on the requested piece of infrastructure, and provisioning that infrastructure for the consumer. The manual approach may work sufficiently when the amount of infrastructure managed is relatively minimal, or the life cycle of resources being provisioned is maintained for longer. Thus, this type of infrastructure has a limited scale of deployment. When large-scale provisioning requests are made and/or the provisioning requests are directed toward short-term resources, the ability for manual management of provisioning resources becomes more difficult.

Modern data centers and other computing environments can include anywhere from a few host computer systems to thousands of systems configured to process data, service requests, and perform various types of computational tasks. Many enterprises utilize these computing environments to deploy containerized microservices that work independently and in conjunction to implement distinct features for their users. Infrastructure management of these microservices requires that they specify the number of resources needed during provisioning. As mentioned, determining the appropriate amount of resources to provision a microservice can be difficult as requesting fewer resources can result in Service Level Agreement (SLA) violations, while requesting more resources can lead to poor resource utilization and wastage.

An approach to resolve these issues involves infrastructure management implementations that scale-up resources to handle loads during peak hours of the day and scale down resources when demand is low. However, constantly performing manual scaling is impractical when handling thousands of microservices. To automate the process, autoscalers are utilized to perform automated resource provisioning to better manage resources in a computing environment. These autoscalers typically leverage various predefined configuration parameters to add or remove resources allocated for an application.

Another automated infrastructure management approach involves reinforcement learning techniques to learn optimal scaling actions through experience (e.g., trial and error) for every application state based on the workload variables. During operation, a reinforcement learning agent receives a reward for each action from the computing environment based on the usefulness of the action. The agent is inclined to execute actions that provide higher rewards, thus reinforcing better actions (e.g., resource provisioning).

Limitations on automated infrastructure management remain, however, as it is challenging to configure the configuration parameters utilized by autoscalers in an application-agnostic manner without the use of a deep workload analysis. Additionally, as the number of microservices increases into the thousands, these strategies fail at learning optimal parameters of every microservice, resulting in resource provisioning being performed in an ad hoc manner or based on heuristics. Current reinforcement learning approaches also suffer from the curse of dimensionality, where the state and action space to be discretized grows exponentially with the number of state variables, leading to scalability problems manifested in unacceptable execution times when updating and selecting the next action to be executed in online settings. These approaches also require a large number of samples to effectively learn, resulting in a lack of stability and interpretability of policy.

Embodiments of the present disclosure overcome the above, and other problems, by implementing a reinforcement learning framework with guided order of learning where a reinforcement learning agent receives reordered microservice information based on their similarities to improve and optimize the learning process. For example, embodiments improve reinforcement learning approaches to infrastructure management by developing metrics to measure the similarities between microservices to enforce an order on learning. Using the guided order of learning, embodiments provide mechanisms to develop a universal agent for optimal performance and scalability in computing environments with a large scale number of microservices.

More specifically, in some embodiments, a Thompson sampling-based bandit agent is used as the reinforcement learning model. In these embodiments, predefined resource configurations correspond to the arms of the bandit. Performance evaluations of the microservices are used to derive the rewards (i.e., feedback) given to the reinforcement learning agent. During operation, the agent learns a configuration reward space through the domain-specific reward function (e.g., each arm) to continuously improve upon resource configuration determinations. The guided order of learning technique analyzes service resource information to order the microservices to assist the reinforcement learning agent in learning in a sample-efficient manner and effectively determine optimal resource configurations for the microservices.

In some embodiments, the similarity analysis performed on the microservices is based on a Dynamic Time Warping (DTW) similarity measure. DTW measures the similarity between two temporal sequences, which may vary in speed. In this instance, the DTW similarity measure measures Central Processing Unit (CPU) usages of two signals (e.g., the microservices) to get a time-domain similarity and a computer cosine similarity measure of the CPU usage signals in a frequency domain (i.e., by fast Fourier transform (FFT)). The overall similarity score can then be calculated as the weighted sum of the similarity measures in both the time and frequency domains.

In some embodiments, the computer cosine similarity measure is computed using reward vectors between two microservices being compared. Cosine similarity is a measure of similarity between two sequences of numbers. In this instance, the sequence of numbers is represented by the reward vectors that define the value ordered by time. The sequence of rewards is viewed as vectors in an inner product space, and the cosine similarity is defined as the cosine of the angle between the vectors (i.e., the dot product of the reward vectors divided by the product of their values).

In some embodiments, the reinforcement learning agent learns its resource configuration reward space through a domain-specific reward function. Each predefined resource configuration, for a given computing environment, can correspond to an arm (i.e., domain) of a multi-armed bandit configuration. The performance of a microservice using a given resource configuration (i.e., arm) can then be used as a metric to derive the reward for the reinforcement learning agent.

In some embodiments, the reward function is computed by comparing two sets of resource configuration choices. The utilization, overheads, and performance penalties are collected from the microservices while operating in both resource configurations. The reward can be encoded as a sum of these terms, namely, resource wastage (i.e., utilization estimation), penalties when the microservice does not meet required performance constraints (RPM, latency), and the number of times the microservice undergoes scaling based on its usage and configuration. The resource wastage can be computed as the difference between the total allocated CPUs and the total CPUs used by a microservice. The number of scalings can refer to the count of scaling events associated with scaling the microservice when the microservice hits a scaling threshold.

In some embodiments, the service resource information includes workload states, resource usage, and current resource configurations for the microservices operating in a computing environment. Resource usage can include CPU usage, memory usage, storage usage, network usage, and the like. This information can be used to perform various similarity analyses for the guided order of the learning process.

As described throughout, a "service computing resource" or "resource" refers to a computer system resource that is accessible and/or made available through a computing environment, a cloud computing system, or a cloud computing architecture. Examples of resources include, but are not limited to, applications, services (e.g., physical servers, virtual servers), computing components (e.g., CPU, memory), data storage components, development tools, and network capabilities. A resource is sometimes hosted at a remote data center managed by a cloud services provider (CSP). In some instances, access to a resource can be provided by a CSP in association with a subscription-based service (e.g., a resource can be made available for a monthly subscription fee based on usage).

Thus, the techniques described herein provide various improvements over conventional methods. For example, embodiments that provision microservices converge to optimal provisioning through the use of a more efficient training mechanism over the prior art in the form of guided order of learning of a multi-armed bandit agent model. The training mechanism allows the bandit agent model to be trained in a sample-efficient manner as the order of learning achieves optimal results in fewer samples as compared to the prior art. Furthermore, embodiments that support the order of learning provide a more efficient training order mechanism that utilizes similarity measurements of microservices when ordering the learning of the microservices. By providing the ordered learning of microservices for training a reinforcement learning agent, the agent learns in a more sample-efficient and robust manner that can effectively provision resources in computing environments having a large-scale number of microservices.

Example Reinforcement Learning Framework

Referring now to FIG. 1, a block diagram of an example reinforcement learning framework 100 suitable for use in implementing embodiments of the disclosure is shown. Generally, the reinforcement learning framework 100 is suitable for providing resource provisioning determinations for microservices operating in a computing environment. The reinforcement learning framework 100 includes input data 102, a resource provisioning system 105, and output data 150. The resource provisioning system 105 includes a similarity analyzer 110, resource configurations 120, and a reinforcement learning agent 130. The similarity analyzer 110 includes DTW metrics 114 and cosine similarity metrics 116. The reinforcement learning agent 130 includes a reward function 133, a policy 136, and reinforcement learning algorithms 139.

FIG. 1 illustrates a diagram of an architecture for provisioning resources to microservices operating within a computing environment in accordance with embodiments of the present disclosure. The reinforcement learning framework 100 uses guided order of learning to facilitate training of the reinforcement learning agent 130 to make resource provisioning determinations and update the policy 136 based on those determinations. The guided order of learning orders the data relating to each microservice and reorders that data based on a similarity analysis allowing the reinforcement learning agent 130 to avoid exponential state variable growth limiting the scalability of the reinforcement learning agent 130 while also training the reinforcement learning agent 130 in a sample-efficient manner. As such, training the reinforcement learning agent 130 converges to optimal performance quicker than other conventional methods while operating in a computing environment with a large scale number of microservices.

The reinforcement learning framework 100 can be implemented as a standalone application or as part of another application or suite of applications. For example, in some embodiments, the reinforcement learning framework 100 is implemented as part of a data center management application, enabling the resource provisioning determinations to be obtained and utilized by the data center management application. Alternatively, once the resource provisioning determinations are generated by the reinforcement learning framework 100, they can be provided to a data center management application for implementation into the microservices.

As an exemplary implementation and operation of the reinforcement learning framework 100, the resource provisioning system 105 receives input data 102. As discussed further below, the resource provisioning system 105 is trained using a plurality of information regarding microservices operating in a computing environment. The input data includes, but is not limited to, microservice configurations, monitoring information, resource configurations, log information, performance information, and states of the microservices. The microservices information can be captured using microservice monitoring platforms operating within a computing environment.

The similarity analyzer 110 performs a similarity analysis on each microservice information for each microservice provided in the input data 102. In some embodiments, the similarity analysis includes DTW metrics 114 and cosine similarity metrics 116. The result is a similarity score based on the similarity analyses performed. The similarity analyzer 110 measures the similarities between the microservices to enforce an order on learning service resource information associated with the microservices. The DTW metric 114 is based on the similarity of a CPU usage signal in a time domain and a frequency domain. The cosine similarity metric 116 is based on the cosine similarity of the reward vector of the microservices. After deriving both of the metrics, an overall similarity score is determined as the weighted sum of the two similarity metrics for each microservice. Using the weighted sum as a similarity indicator, the service resource information can be ordered such that the similarity between two adjacent microservices is close together.

For example, the similarity analyzer 110 computes one or more similarity analysis metrics (e.g., the DTW metrics 114, the cosine similarity metrics 116) to generate a similarity score for each microservice provided in the input data 102. The microservices can then be arranged in the order of their similarity such that microservices with closely matching similarity scores are ordered next to one another. The guided order of service resource information is then inputted in the reinforcement learning agent 130 for analysis and resource configuration determinations for each microservice. Unlike prior techniques that use heuristics for provisioning microservices, embodiments described herein utilize a reinforcement learning agent to determine resource configurations 120 based on the service resource information provided. The guided ordering of microservices provides a training mechanism for the reinforcement learning agent 130 that optimizes the learning process allowing the reinforcement learning agent 130 to converge to a state of optimal determinations in a sample-efficient manner.

In some embodiments, the DTW metric 114 is computed using a similarity measure between the CPU usages of two signals that computes a time-domain similarity. DTW can be used to compare the similarity or calculate the distance between two arrays or time series with different lengths. DTW is an algorithm that provides a time-series similarity measure that minimizes the effects of shifting and distortion in time by allowing "elastic" transformation of time series in order to detect similar shapes with different phases. DTW also allows two time series that are similar but locally out of phase to align in a non-linear manner.

In this implementation, and in some embodiments, the DTW metric 114 calculates the CPU usage of a microservice over time while in a first resource configuration and compares it with the CPU usage of the microservice over time while in a second resource configuration. Using the two CPU usage signals, the DTW metric 114 can build a one-to-many and many-to-one match so that the total distance is minimized between the two. In this way, the DTW metric 114 calculates an optimal match between the two sequences (e.g., time series). From the matching, the DTW metric 114 can then calculate the similarity (i.e., distance) between the two sequences.

In some embodiments, the cosine similarity metric 116 is computed using cosine similarity of the CPU usage signals in a frequency domain (i.e., by FFT). Cosine similarity measures the similarity between two vectors of an inner product space. The similarity is measured by the cosine of the angle between two vectors (i.e., the CPU usage signals based on frequency) and determines whether the two vectors are pointing in roughly the same direction. In some implementations, the cosine similarity is represented using a dot product and magnitude as shown in Equation 1:

$$\text{cosine similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad \text{Equation 1}$$

Where A represents a first CPU usage signal n-dimensional vector, B represents a second CPU usage signal n-dimensional vector, and $A_i$ and $B_i$ represent components of vector A and B, respectively. As such, once the similarity metrics are calculated, the similarity score for each microservice can be the weighted sum of the similarities in both a time domain and a frequency domain.

In some embodiments, the cosine similarity metric 116 is computed using the cosine similarity of the reward vectors of the microservices being compared. The sequence of rewards are viewed as vectors in an inner product space, and the cosine similarity is defined as the cosine of the angle between the vectors (i.e., the dot product of the reward vectors divided by the product of their values).

As illustrated in FIG. 1, the resource provisioning system 105 also includes predefined resource configurations 120. The resource configuration 120 includes predefined configuration parameters that list possible resource configurations available to an application. These resource configurations 120 can vary based on the state of a microservice and can be implemented onto a microservice that is based on that state.

The resource provisioning system 105 also includes a reinforcement learning agent 130 configured to determine resource configurations for services operating a computing environment. The output data 150 (i.e., theresource configuration determinations 155) can be based, at least in part, on the reinforcement learning agent 130 learning optimal resource configurations using service resource information as input data 102.

Standard reinforcement-learning agents operate via a connection with an environment (e.g., a computing environment or a cloud system). The agents receive an input (e.g., the state of a microservice) and then choose an action (e.g., resource configuration determination) to generate as output. The action changes the state of the environment (e.g., applying the resource configuration determination to a microservice). The agent's behavior should choose actions that tend to increase the long-run sum of values of a reinforcement signal. It can learn to do this over time by systematic trial and error, and guided by a wide variety of algorithms.

In various embodiments, the reinforcement learning agent 130 is implemented using various reinforcement learning algorithms 139. These reinforcement learning algorithms 139 include, but are not limited to, brute force, value function, Monte Carlo methods, temporal difference methods, function approximation methods, direct policy search, and the like. Alternatively, the reinforcement learning agent 130 can combine the above-mentioned methods with algorithms that first learn a model. In some embodiments, the reinforcement learning agent 130 implements a multi-armed bandit reinforcement learning algorithm 139. In these embodiments, the multi-armed bandit is configured where each resource configuration 120 corresponds to an arm of the multi-armed bandit. In this configuration, microservice performance is used to derive a reward.

In some implementations, the reward function 133 is developed to determine the accuracy of the reinforcement learning agent 130 during time t (which can be considered a continuous variable) as a way to evaluate a microservice's performance. In some implementations, Thompson sampling is utilized to maximize the expected reward. Thompson sampling is a heuristic for choosing actions that address the exploration-exploitation dilemma in a multi-armed bandit configuration. As opposed to the reinforcement learning agent 130 selecting its action based on current averages of the rewards it receives from those actions, Thompson sampling develops a probability model from the obtained rewards, and samples from the probability model to choose an action. In this way, an increasingly accurate estimate of possible rewards is obtained. Additionally, the probability model also provides a level of confidence in the reward, with the confidence increasing as more samples are collected.

In some embodiments, the reinforcement learning agent 130 optimizes the resource configurations determinations as follows. Initially, the reinforcement learning agent 130, represented by $(P(\theta|D_i))$, receives the resource configurations 120 defined by C. For the ith configuration, the reinforcement learning agent 130 samples the parameter of a prior distribution ($\theta_i$) defined by $\theta_i \sim P(\theta|D_i)$, where the prior distribution can be a Gaussian or Beta distribution depending on the input data 102 format of the microservice. In some embodiments, the reinforcement learning agent 130 recommends an optimal configuration from the possible resource configurations 120, by choosing $\hat{i} = \arg\max_{i \in C} \theta_i$. The microservice can operate in the selected resource configuration (e.g., the $\hat{i}$th configuration) and provides feedback ($r_t$) to the reinforcement learning agent 130. As such, the feedback can update the reinforcement learning agent 130 ($P(\theta|D_i)$) where $D_i = D_i \cup (\hat{i}, r_t)$.

In some implementations, the reward function 133 is encoded as a sum of the feedback, including utilization, overheads, and performance penalties provided by the microservices while in their updated resource configurations. The reward can be encoded as a sum of these metrics, including resource wastage (e.g., an estimate of utilization). A penalty can be assigned when a microservice does not meet required performance constraints and/or when the number of times the microservice undergoes scaling based on its usage and configuration. For example, performance constraints such as real-time performance monitoring (RPM)/latency is not met. RPM is a configurable tool that can probe a microservice and monitor the analyzed results to determine information such as packet loss, round-trip time, and jitter. Each probed microservice can be monitored over a test. A test can represent a collection of probes, sent out at regular interval, as defined by a configuration. From the test, statistics can be derived to determine the efficiency and/or performance of the microservice.

In some embodiments, the resource wastage is calculated based on the difference between the total allocated central processing units (CPUs) and the total used CPUs for a microservice. The number of scalings can refer to the count of scaling events associated with scaling the microservice up (adding containers) or down (reducing containers) when the microservice hits a predefined scaling threshold. In some implementations, the reward function 133 applies a penalty to the reinforcement learning agent 130 when a microservice does not meet a predefined required performance. As such, the reward function 133 can operate to minimize the overall sum of the resource wastage, performance penalty, and a number of scalings made by a cluster manager on behalf of a microservice during a given usage interval.

In some embodiments, the reward function 133 is linear in terms of the above-mentioned microservice characteristics. As such, the reward function 133 is a negative weighted sum of these factors as represented in Equation 2 as follows:

$$f(t) = 1 - (w_{perf} * \tilde{p}(t) + w_{waste} * \tilde{w}(t) + w_{overhead} * \tilde{s}(t)) \quad \text{Equation 2}$$

Where $f(t)$ represents the reward function 133, $w_{perf}$ represents performance penalties incurred by a particular microservice, $w_{waste}$ represents resource wastage of the microservice, $w_{overhead}$ represents overheads of the microservice, where $\tilde{w}(t)$ represents a normalized difference between allocated and used CPUs, and $\tilde{s}(t)$ represents normalized scalings relating to the microservice.

Figure 2:
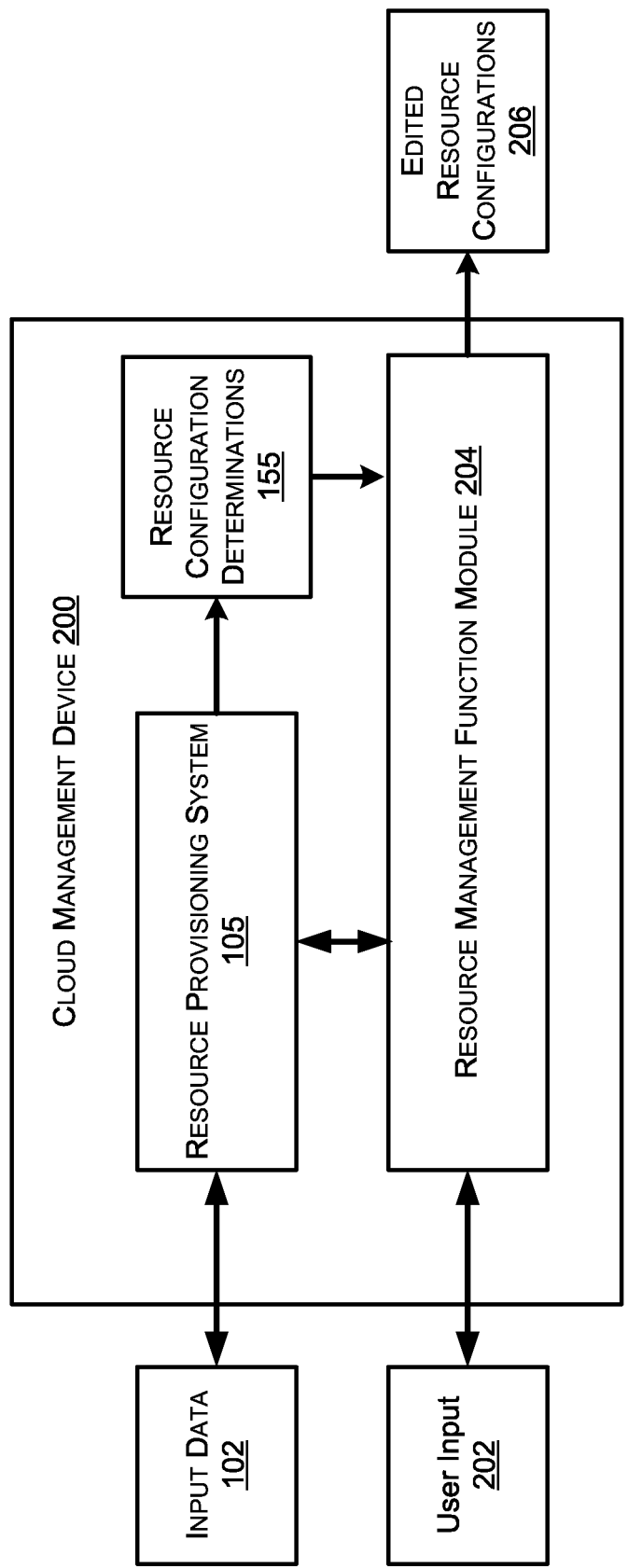
FIG. 2 is a block diagram of an example of provisioning and editing a resource configuration determination, in accordance with embodiments of the present disclosure.

Referring now to FIG. 2, FIG. 2 illustrates an example of a cloud management device 200 for managing and provisioning microservices operating in a computing environment (e.g., a data center, cloud computing environment, cloud computing architecture), in accordance with embodiments of the present disclosure. As discussed, the techniques described herein enable a reinforcement learning agent to predict resource configurations for microservices operating within a computing environment. Accordingly, in some embodiments, a computing environment can provide input data 102 to train the reinforcement learning agent 130, of the resource provisioning system 105, to produce its resource configuration determinations 155. The resource configuration determinations 155 can relate to the predefined resource configurations 120 associated with a particular computing environment. As shown in FIG. 2, in some configurations, the resource provisioning system 105 is implemented as part of a cloud management device 200. In other configurations, the resource provisioning system 105 is implemented as a separate system that provides at least the resource configuration determinations 155 to the cloud management device 200 to be implemented onto the microservices managed by the cloud management device 200.

Once the resource configuration determinations 155 represent a resource configuration determination of at least one microservice operating in a computing environment and has been obtained by the cloud management device 200, the resource configuration determinations 155 can be edited and/or implemented by the cloud management device 200. For example user input 202 can be received by a resource management function module 204 of the cloud management device 200. The user input 202 includes user service forms of users utilizing a cloud data center. The user service forms can represent microservices desired to receive from the users. Additionally, the user service forms can include the number and performance of a server that the user requires and a network topology that combines these microservices with a specific method. Additionally, the user service forms can also include requirements and/or restrictions when provisioning resources. The resource management function module 204 can analyze the resource configuration determinations 155 and the user input 202 to generate edited resource configurations 206. Once the resource configuration editing is complete, the edited resource configuration 206 is outputted and can be used to provision microservices in the computing environment.

Figure 3:
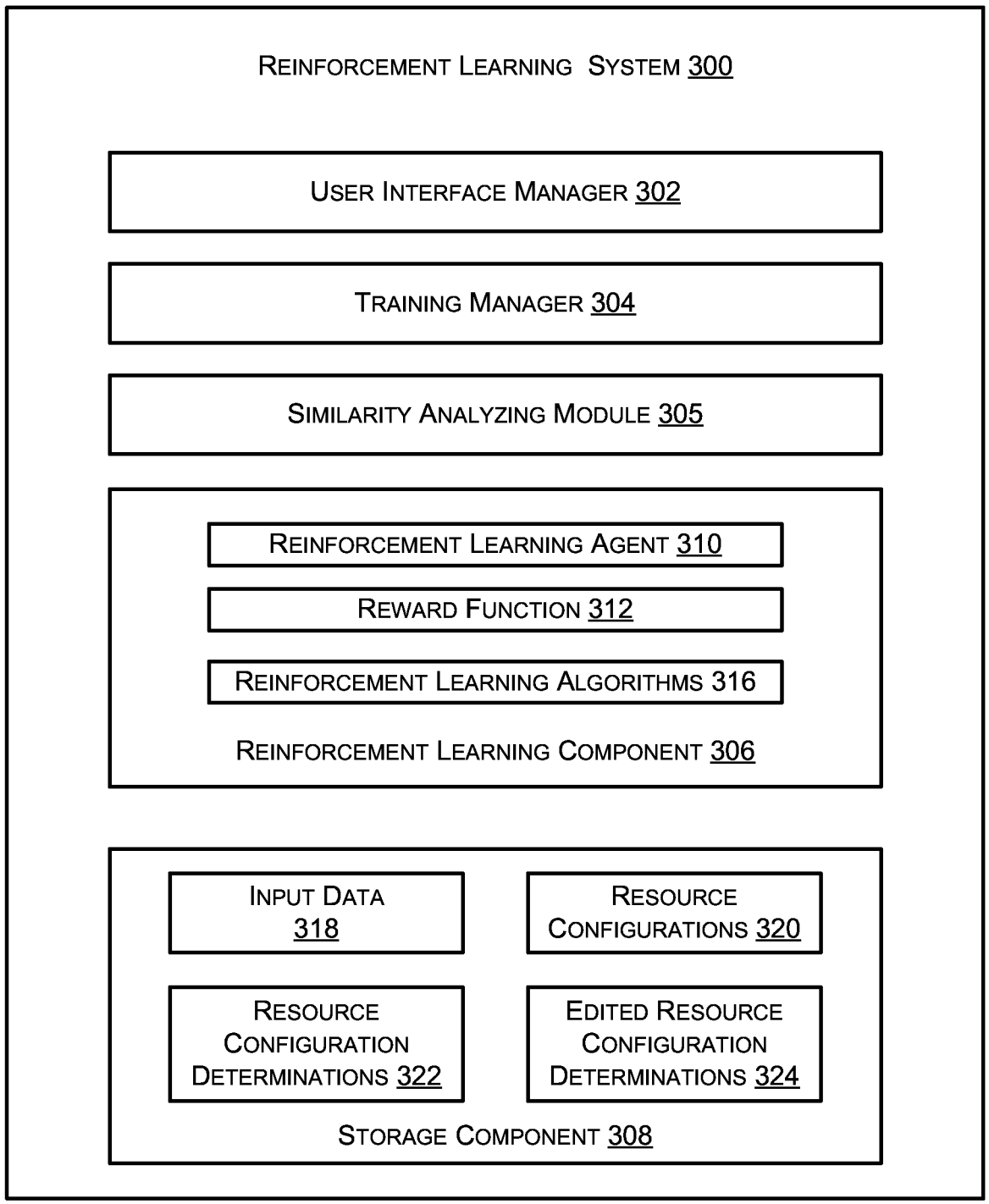
FIG. 3 is a block diagram of a schematic diagram of a reinforcement learning system, in accordance with embodiments of the present disclosure.

FIG. 3 illustrates a schematic diagram of a reinforcement learning system 300 (e.g., "reinforcement learning framework 100" and "the resource provisioning system 105" described above) in accordance with embodiments of the present disclosure. As shown, the reinforcement learning system 300 includes, but is not limited to, a user interface manager 302, a training manager 304, a similarity analyzing module 305, a reinforcement learning component 306 and a storage component 308. The reinforcement learning component 306 includes a reinforcement learning agent 310, a reward function 312, and reinforcement learning algorithms 316. The storage component 308 includes input data 318, resource configurations 320, resource configuration determinations 322, and edited resource configuration determinations 324.

The user interface manager 302 is a component of the reinforcement learning system 300 configured to allow users to provide input user service forms. In some embodiments, the user interface manager 302 provides a user interface through which the user provides the input data 318 representing data of microservices operating in a computing environment, as discussed above. For example, the user interface enables the user to upload service forms and/or download the service forms from a local or remote storage location (e.g., by providing an address (e.g., a URL or other endpoint) associated with a user request form source). In some embodiments, the user interface can enable a user to link a computing device, such as a desktop, laptop, or other hardware, to transfer user service forms and provide them to the reinforcement learning system 300. In some embodiments, the user interface manager 302 also enables the user to provide a specific resource configuration for a microservice requested by the user. Additionally, the user interface manager 302 allows users to request the reinforcement learning system 300 to produce a resource configuration for a microservice relating to the input data 318. In some embodiments, the user interface manager 302 enables the user to edit the resulting resource configuration directly. Alternatively, as discussed above, the resource configuration determinations 322 can be edited in a cloud management device separate from the reinforcement learning system 300.

As illustrated in FIG. 3, the reinforcement learning system 300 also includes a training manager 304. The training manager 304 teaches guides, tunes, and/or trains one or more reinforcement learning agents based on one or more reinforcement learning algorithms 316 (e.g., multi-armed bandit). In particular, the training manager 304 can train a reinforcement learning agent based on a plurality of training data prior to deployment and establish a baseline machine learning model. More specifically, the training manager 304 can access, identify, generate, create, and/or determine training input and utilize the training input and reward function 312 to train and fine-tune a reinforcement learning agent. In some examples, the training manager 304 trains the reinforcement learning agent 310, as discussed above. In some embodiments, the reinforcement learning agent 310 is trained specifically for a particular computing environment. For example, a reinforcement learning agent 310 is initially trained based on microservices operating in a particular computing environment (or continuously trained while deployed within the computing environment) to predict optimal resource configurations for the microservice so as to minimize resource wastage and optimize microservice performance.

As also illustrated in FIG. 3, the reinforcement learning system 300 includes a similarity analyzing module 305. The similarity analyzing module 305 implements similarity analyzing techniques (e.g., DTW metrics, cosine similarity metrics) to generate similarity scores for each microservice described in the input data 318. The similarity analyzing module 305 can order the data of the microservices based on their similarity scores. For example, the microservices (i.e., the microservice data contained in the input data 318) are in order based on how closely similar microservices are to one another. As such, the similarity analyzing module 305 can generate a guided order of learning. The resulting guided order of learning of microservices is provided to the reinforcement learning component 306 to process and train the reinforcement learning agent 310 and to allow the reinforcement learning agent 310 to provide resource configuration determinations 322.

As illustrated in FIG. 3, the reinforcement learning system 300 includes a reinforcement learning component 306. The reinforcement learning component 306 hosts at least one reinforcement learning agent. The reinforcement learning component 306 includes an execution environment, libraries, and/or any other data needed to execute the reinforcement learning agent 310. In some embodiments, the reinforcement learning component 306 is associated with dedicated software and/or hardware resources to execute the reinforcement learning agent 310. As discussed, the reinforcement learning agent 310 can be implemented as a multi-armed bandit technique or other types of reinforcement learning techniques.

Although depicted in FIG. 3 as being hosted by a single reinforcement learning component 306. In various embodiments, the reinforcement learning agent 310 is hosted in multiple reinforcement learning components and/or as part of different components. For example, a resource provisioning system (e.g., the resource provisioning system 105) can host the reinforcement learning agent 310. In various embodiments, the reinforcement learning component 306 is hosted on a separate environment, in which the reinforcement learning agent 310 executes.

As illustrated in FIG. 3, the reinforcement learning system 300 also includes the storage component 308. The storage component 308 maintains data for the reinforcement learning system 300. The storage component 308 can maintain data of any type, size, or kind as necessary to perform the functions of the reinforcement learning system 300. The storage component 308, as shown in FIG. 3, includes the input data 318. The input data 318 can include microservice data relating to a plurality of microservices operating in and associated with a computing environment, as discussed in additional detail above. In one or more embodiments, the input data 318 includes training data utilized by the training manager 304 to initially train the reinforcement learning agent 310 and to prepare the reinforcement learning agent 310 for online deployment. Once deployed in a computing environment, the training manager 304 can continuously train the reinforcement learning agent 310 using the continuous input data 318 received from the computing environment and the reward function 312.

As further illustrated in FIG. 3, the storage component 308 also includes the resource configuration determinations 322 produced by the reinforcement learning agent 310 for microservices associated with the input data 318. The resource configuration determination can provide at least one resource configuration for a microservice to minimize resource wastage and provide enough resources during peak operating times. The resource configuration determinations 322 can be edited using conventional resource provisioning techniques (e.g., to generate the edited resource configuration determinations 324) to change the suggested resource configuration for a microservice. In some configurations, the edited resource configuration determinations 324 include modified versions of the resource configuration determinations 322. For example, the edited resource configuration determinations 324 may have been edited using conventional resource provisioning techniques via a resource management application. For instance, the resource management application may slightly alter the resource configuration determination 322 to add or remove particular resources.

Each component 302-308 of the reinforcement learning system 300 and their corresponding elements (as shown in FIG. 3) can be in communication with one another using suitable communication technologies. It will be recognized that although components 302-308 are shown to be separate in FIG. 3, any of the components 302-308 and their corresponding elements can be combined into few components, such as into a single facility or module, divided into more components, or configured into different components as can serve a particular embodiment.

The components 302-308 and their corresponding elements can comprise software, hardware, or both. For example, the component 302-308 and their elements can comprise one or more instructions stored on a computer-readable storage medium and executable by processors of one or more computing devices. When executed by the one or more processors, the computer-executable instructions of the reinforcement learning system 300 can cause a client device and/or a server device to perform the methods described herein. Alternatively, the component 302-308 and their corresponding elements can comprise hardware, such as a special-purpose processing device, to perform a certain function or group of functions. Additionally, the components 302-308 and their corresponding elements can comprise a combination of computer-executable instructions and hardware.

Furthermore, the components 302-308 of the reinforcement learning system 300 can, for example, be implemented as one or more standalone applications, as one or more modules of an application, as one or more plug-ins, as one or more library functions or functions that can be called by other applications, and/or as a cloud-computing model. Thus, the components 302-308 of the reinforcement learning system 300 can be implemented as a standalone application, such as a desktop or mobile application. Furthermore, the components 302-308 of the reinforcement learning system 300 can be implemented as one or more web-based applications hosted on a remote server.

Thus, the illustrative embodiments in FIGS. 1-3 and described herein, provide various improvements over conventional methods. For example, embodiments that provision microservices converge to optimal provisioning through the use of a more efficient training mechanism over the prior art in the form of guided order of learning of a multi-armed bandit agent. The training mechanism allows the multi-armed bandit agent to be trained in a sample-efficient manner as the order of learning achieves optimal results in fewer sample as compared to the prior art. Embodiments that support order of learning provide a more efficient training order mechanism that utilizes similarity measurements of microservices when ordering the learning of the microservices. Furthermore, by providing ordered learning of microservices for training a reinforcement learning agent, the reinforcement learning agent learns in a more sample-efficient and robust manner that can effectively provision resources in computing environments having a large-scale number of microservices.

Figure 4:
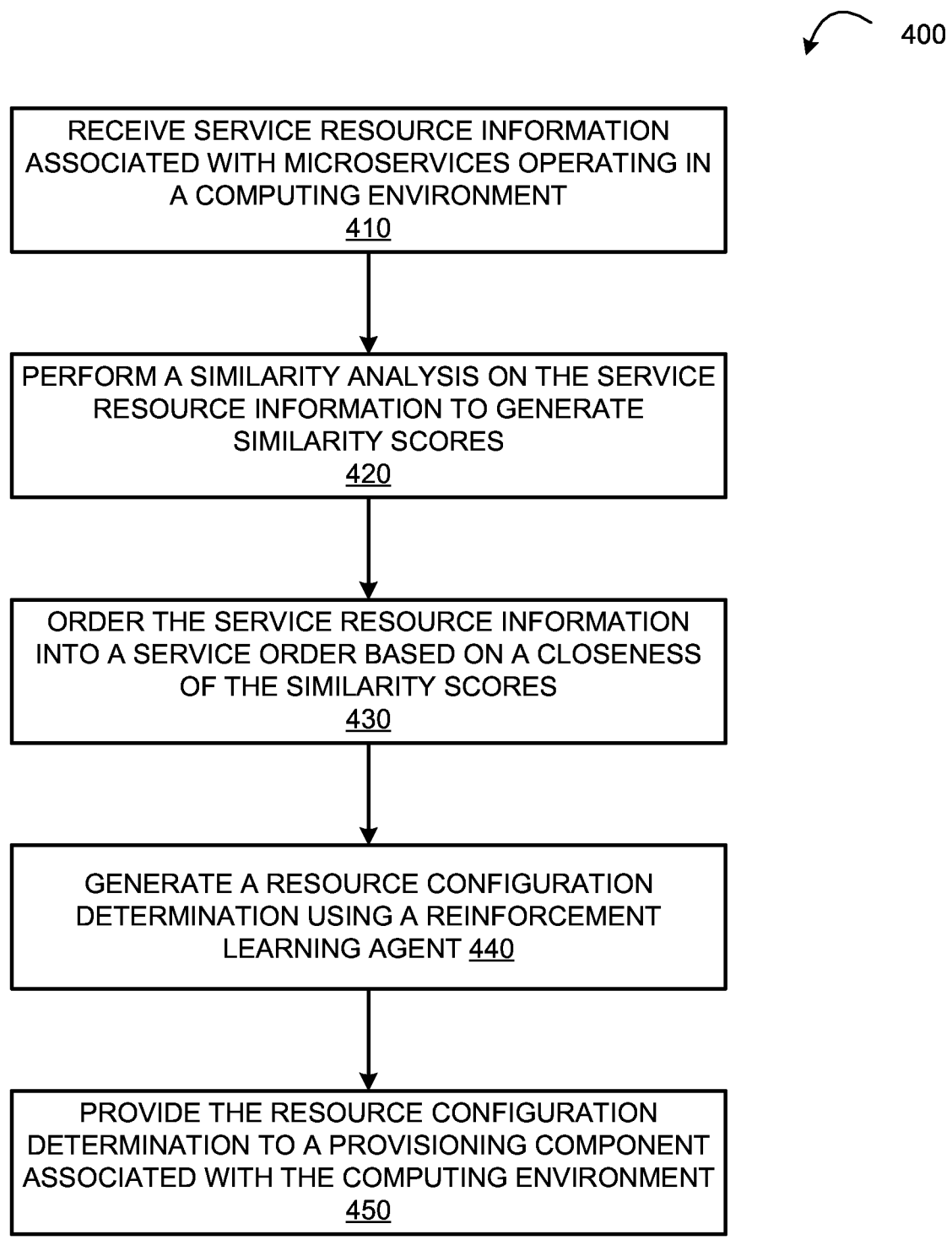
FIG. 4 illustrates a flowchart of a series of acts in a method of resource configuration determinations using a reinforcement learning agent and in accordance with embodiments of the present disclosure.
Figure 5:
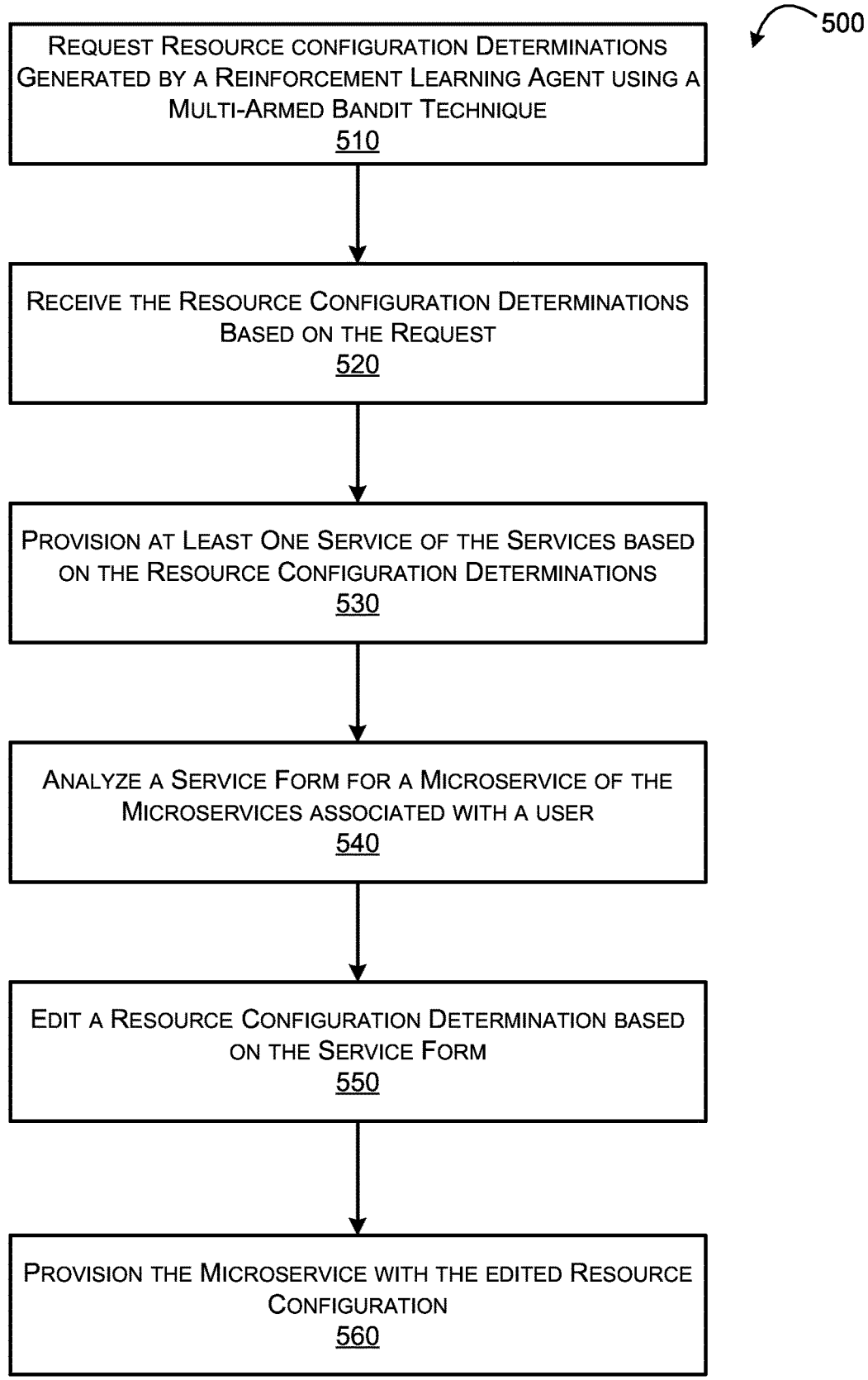
FIG. 5 illustrates a flow chart of a series of acts in a method of resource configuration provisioning and editing in accordance with embodiments of the present disclosure.

In addition to the foregoing, embodiments can also be described in terms of flowcharts comprising acts and steps in a method for accomplishing a particular result. For example, FIGS. 4 and 5 illustrate flowcharts of exemplary methods in accordance with one or more embodiments. The methods described in relation to FIGS. 4 and 5 can be performed with fewer or more steps/acts or the steps/acts can be performed in differing orders. Additionally, the steps/acts described herein can be repeated or performed in parallel with one another or in parallel with different instances of the same or similar steps/acts.

Example Flow Diagrams

With reference now to FIGS. 4 and 5, flow diagrams are provided illustrating methods for generating resource configurations for microservices operating in a computing environment using a reinforcement learning agent. Each block of methods 400 and 500 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a microservice or hosted microservice (standalone or in combination with another hosted microservice), or a plug-in to another product, to name a few.

FIG. 4 illustrates a flowchart of a method 400 that includes a series of acts of resource provisioning of microservices operating in a computing environment, in accordance with one or more embodiments of the present disclosure. In one or more embodiments, the method 400 is performed in a digital medium environment that includes the reinforcement learning framework 300. The method 400 is intended to be illustrative of one or more methods in accordance with the present disclosure and is not intended to limit potential embodiments. Alternative embodiments can include additional, fewer, or different steps than those articulated in FIG. 4.

As illustrated in FIG. 4, the method 400 includes an act 410 of receiving service resource information associated with microservices operating in a computing environment into a resource provisioning system (e.g., the resource provisioning system 105 as shown in FIG. 1). In some embodiments, the service resource information is transmitted and received automatically and at an interval to provide the resource provisioning system with constant state information of the microservices. In some other embodiments, the service resource information is provided by a user (e.g., cluster manager, administrator) to trigger a provisioning analysis. The service resource information can include resource information regarding the state of the microservices. This state information includes, but is not limited to, bandwidth resource information, CPU resource amount and usage, memory resource amount and usage, storage resource usage, and network resource usage that the microservices are allocated and are currently and/or have used during their operation in the computing environment.

As illustrated in FIG. 4, the method 400 includes an act 420 of performing a similarity analysis on the service resource information using a similarity analyzer (e.g., the similarity analyzer 110 of FIG. 1) to produce similarity scores for the microservices referenced in the resource configuration information. In some embodiments, two metrics are calculated and the weighted sum of their results is the similarity score. A similarity score can be calculated for each microservice associated with the service resource configuration. The first metric computes a DTW similarity measure between the CPU usages of two signals to a time-domain similarity. The second metric is a computer cosine similarity measure of the CPU usage in a frequency domain. In some embodiments, the cosine similarity is calculated using FFT. Once each metric is calculated, the weighted sum is computed and determined as the similarity score.

As also illustrated in FIG. 4, the method 400 includes an act 430 of ordering the service resource information into a service order based on the closeness of the similarity scores of the microservices performed above. Based on the metrics, an optimal ingestion order for the reinforcement learning agent can be achieved by making the similarity between two adjacent microservices (e.g., their corresponding service resource information) as small as possible. This can be due to services with similar functionality (i.e., similar resource usage and configuration) and deployed within the same region having similar demand patterns allowing the reinforcement agent to quickly learn optimal resource configurations.

As illustrated in FIG. 4, the method 400 includes an act 440 of generating a resource configuration determination for at least one microservice of the microservices associated with the service resource information. The resource configuration determination is determined by a reinforcement learning agent using the service resource information as input and in the service order determined above. In some embodiments, the resource configuration determination is a selection of a resource configuration taken from a list of predefined resource configurations available within a computing environment. These predefined resource configurations can define the number of CPUS, memory, storage, network allocation, and the like to be provisioned to a microservice.

As illustrated in FIG. 4, the method 400 includes an act 450 of providing the resource configuration determination to a provisioning component associated with the computing environment operating the microservices. The provisioning component can be a cloud management device (e.g., the cloud management device 200 of FIG. 2), a load balancer, a data center provisioning component, or any other mechanism used for provisioning resources of a computing environment.

FIG. 5 illustrates a flowchart of a series of acts in a method of requesting resource configuration determinations in accordance with one or more embodiments. In one or more embodiments, the method 500 is performed in a digital medium environment that can include the reinforcement learning system 300. The method 500 is intended to be illustrative of one or more methods in accordance with the present disclosure and is not intended to limit potential embodiment. Alternative embodiments can include additional, fewer, or different steps than those articulated in FIG. 5.

As illustrated in FIG. 5, the method 500 includes an act 510 of requesting resource configuration determinations produced by a reinforcement learning agent. The reinforcement learning agent can generate the resource configuration determinations for microservices operating in a computing environment using guided order of learning. In some embodiments, the reinforcement learning agent employs a multi-armed bandit technique such that predefined resource configurations for microservices are used as the arms for the technique.

As illustrated in FIG. 5, the method 500 includes an act 520 of receiving the resource configuration determinations based on the request. For example, the resource configuration determinations can be generated by a reinforcement learning system, as discussed above. In some configurations, the reinforcement learning system is implemented as part of a cloud management device or implemented as a separate system which makes the resource configuration determinations available to the cloud management device for implementation and editing.

As illustrated in FIG. 5, the method 500 includes an act 530 of provisioning at least one microservice based on the resource configuration determinations. In some instances, no change is necessary as a microservice may already being operating in an optimal resource configuration. However, if the resource configuration determination deviates from the current resource configuration a microservice is operating in, then that resource configuration can be replaced with the resource configuration determination provided by the reinforcement learning system. The provisioning can allocate resources such as the number of CPUs, the amount of memory, the amount of storage, and the like.

As illustrated in FIG. 5, the method 500 includes an act 540 of analyzing a user service form of one of the microservices operating associated with a user providing the service form. The service form can include resource preferences and/or restrictions imposed on a microservice associated with a user. For instance, a service form may dictate that only a certain number of CPUs may be allocated to a microservice, or that the amount of memory allocated must not change. As such, the service form can be compared with a corresponding resource configuration determination to ensure that the resource configuration determination does not violate any rules or restrictions imposed by the service form.

As illustrated in FIG. 5, the method 500 includes an act 550 of editing the resource configuration determination based on the service form. In instances where the resource configuration determination violates and/or conflicts with the service form, then a provisioning component can edit the resource configuration determination so as not to conflict with the service form. For example, the resource configuration determination may suggest that the microservice be provisioned with four CPUs but the service form dictates that the microservice may only be scaled to three CPUs. Thus, the provisioning component can edit that conflicting resource in the resource configuration determination while leaving the remaining resource recommendations unchanged. As illustrated in FIG. 5, the method 500 includes an act 560 of provisioning the microservice with the edited service configuration.

Example Computing Environment

Figure 6:
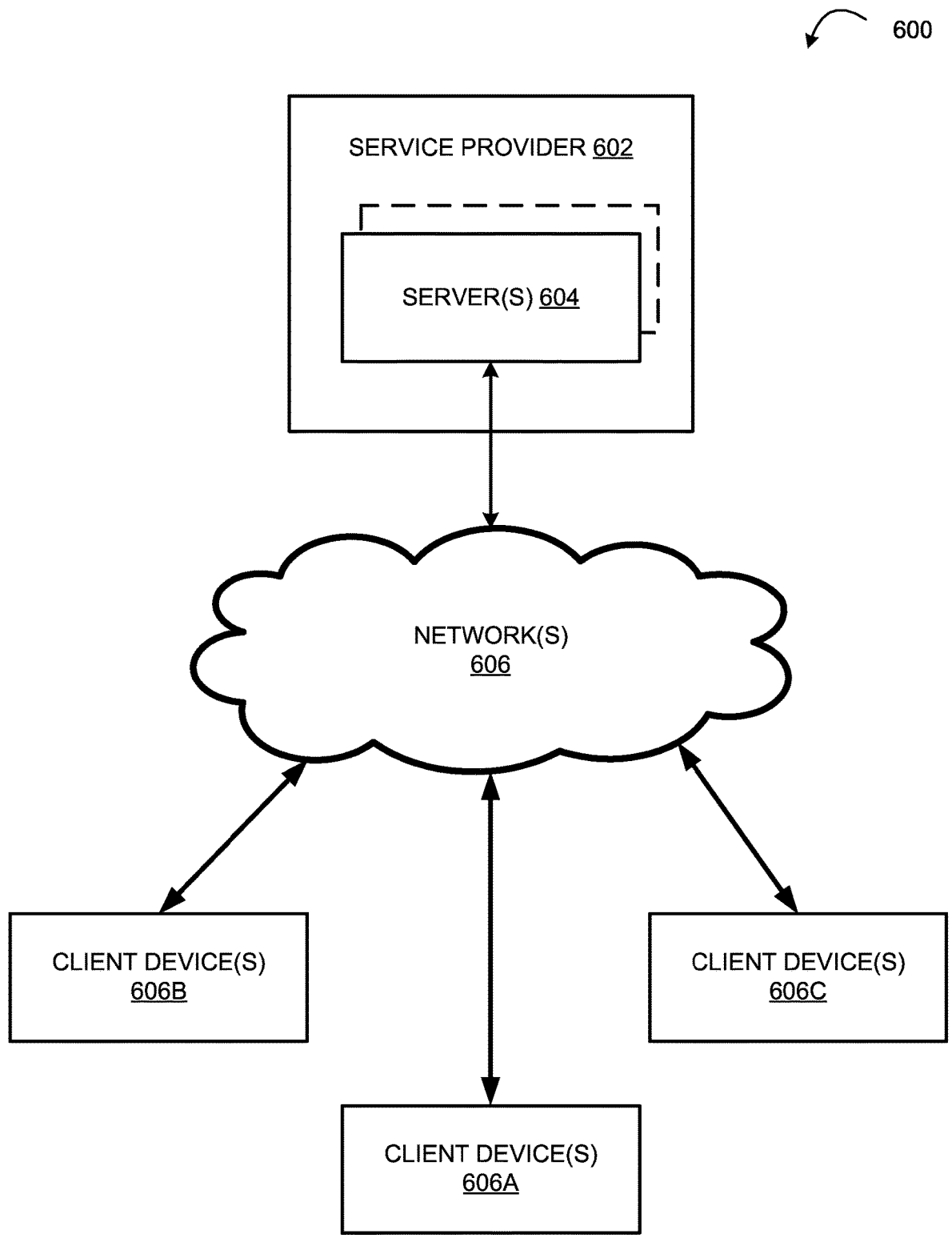
FIG. 6 illustrates a schematic diagram of an exemplary environment in which a resource provisioning system can operate, in accordance with embodiments of the present disclosure.

FIG. 6 illustrates a schematic diagram of an exemplary computing environment 600 in which the can operate in accordance with one or more embodiments of the present disclosure. In one or more embodiments, the computing environment 600 includes a service provider 602, which can include one or more servers 604 connected to a plurality of client devices 606A-606N via one or more networks 608. The client devices 606A-606N, the one or more networks 608, the service provider 602, and the one or more servers 604 can communicate with each other or other components using any communication platforms and technologies suitable for transporting data and/or communication signals, including any known communication technologies, devices, media, and protocols supportive of remote data communications, examples of which will be described in more detail below with respect to FIG. 7.

Although FIG. 6 illustrates a particular arrangement of the client devices 606A-606N, the one or more networks 608, the service provider 602, and the one or more servers 604, various additional arrangements are possible. For example, the client devices 606A-606N can directly communicate with one or more servers 604, bypassing the network 608. Or alternatively, the client devices 606A-606N can directly communicate with each other. The service provider 602 can be a public cloud service provider which owns and operates its own infrastructure in one or more data centers and provides this infrastructure to customers and end users on demand to host applications on the one or more servers 604. The servers can include one or more hardware servers (e.g., hosts), each with its own computing resources (e.g., processors, memory, disk space, networking bandwidth, etc.), which can be securely divided between multiple customers, each of which hosts their own applications on the one or more servers.

In some embodiments, the service provider can be a private cloud provider which maintains cloud infrastructure for a single organization. The one or more servers 604 can similarly include one or more hardware servers, each with its own computing resources, which are divided among applications hosted by the one or more servers for use by members of the organization or their customers.

Similarly, although the computing environment 600 of FIG. 6 is depicted as having various components, the computing environment 600 can have additional or alternative components. For example, the environment 600 can be implemented on a single computing device with the reinforcement learning system 300. In particular, the reinforcement learning system 300 can be implemented in whole or in part on the client device 602A.

As illustrated in FIG. 6, the environment 600 can include client devices 606A—606N. The client devices 606A-606N can comprise any computing device. For example, client devices 606A-606N can comprise one or more personal computers, laptop computers, mobile devices, mobile phones, tablets, special purpose computers, TVs, or other computing devices, including computing devices described below with regard to FIG. 6. Although three client devices are shown in FIG. 6, it will be appreciated that client devices 606A-606N can comprise any number of client devices (greater or smaller than shown).

Moreover, as illustrated in FIG. 6, the client devices 606A-606N and the one or more server 604 can communicate via one or more networks 608. The one or more networks 608 can represent a single network or a collection of networks (such as the Internet, a corporate Intranet, a virtual private network (VPN), a local area network (LAN), a wireless local network (WLAN), a cellular network, a wide area network (WAN), a metropolitan area network (MAN), or a combination of two or more such networks. Thus, the one or more networks 608 can be any suitable network over which the client devices 606A-606N can access service provider 602 and server 604, or vice versa. The one or more networks 608 will be discussed in more detail below with regard to FIG. 7.

In addition, the environment 600 can also include one or more servers 604. The one or more servers 604 can generate, store, receive, and transmit any type of data, including input data 318, resource configurations 320, resource configuration determinations 322, edited resource configuration determinations 324, or other information. For example, a server 604 can receive data from a client device, such as the client device 606A, and send the data to another client device, such as the client device 602B and/or 602N. The server 604 can also transmit electronic messages between one or more users of the environment 600. In one example embodiment, the server 604 is a data server. The server 604 can also comprise a communication server or a web-hosting server. Additional details regarding the server 604 will be discussed below with respect to FIG. 7.

As mentioned, in one or more embodiments, the one or more servers 604 can include or implement at least a portion of the reinforcement learning framework 100, resource provisioning system 104, and/or reinforcement learning system 300. In particular, the reinforcement learning system 300 can comprise an application running on the one or more servers 604 or a portion of the reinforcement learning system 300 can be downloaded from the one or more servers 604. For example, the reinforcement learning system 300 can include a web hosting application that allows the client devices 606A-606N to interact with content hosted at the one or more servers 604. To illustrate, in one or more embodiments of the environment 600, one or more client devices 606A-606N can access a webpage supported by the one or more servers 604. In particular, the client device 606A can run a web application (e.g., a web browser) to allow a user to access, view, and/or interact with a webpage or website hosted at the one or more servers 604.

Upon the client device 606A accessing a webpage or other web application hosted at the one or more servers 604, in one or more embodiments, the one or more servers 604 can provide access to service resource information (e.g., the input data 318, such as service resource information from microservices in the environment 600) stored at the one or more servers 604. Moreover, the client device 606A can receive a request (i.e., via user input) to perform resource provisioning and provide the request to the one or more servers 604. Upon receiving the request, the one or more servers 604 can automatically perform the methods and processes described above. The one or more servers 604 can provide all or portions of the resource configuration determinations, to the client device 606A for display to the user. The one or more servers can also host a cloud management device used to apply and/or edit the resource configuration determinations of the microservices operating in the computing environment 600.

As just described, the reinforcement learning system 300 can be implemented in whole, or in part, by the individual elements 602-608 of the computing environment 600. It will be appreciated that although certain components of the reinforcement learning system 300 are described in the previous examples with regard to particular elements of the computing environment 600, various alternative implementations are possible. For instance, in one or more embodiments, the reinforcement learning system 300 is implemented on any of the client devices 606A-N. Similarly, in one or more embodiments, the reinforcement learning system 300 can be implemented on the one or more servers 604. Moreover, different components and functions of the reinforcement learning system 300 can be implemented separately among client devices 606A-606N, the one or more servers 604, and the network 608.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological act, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, handheld devices, multiprocessor systems, microprocessor-based or programmable consumer electronics, network PCs, minicomputers, main frame computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud-computing environment" is an environment in which cloud computing is employed.

Example Operating Environment

Figure 7:
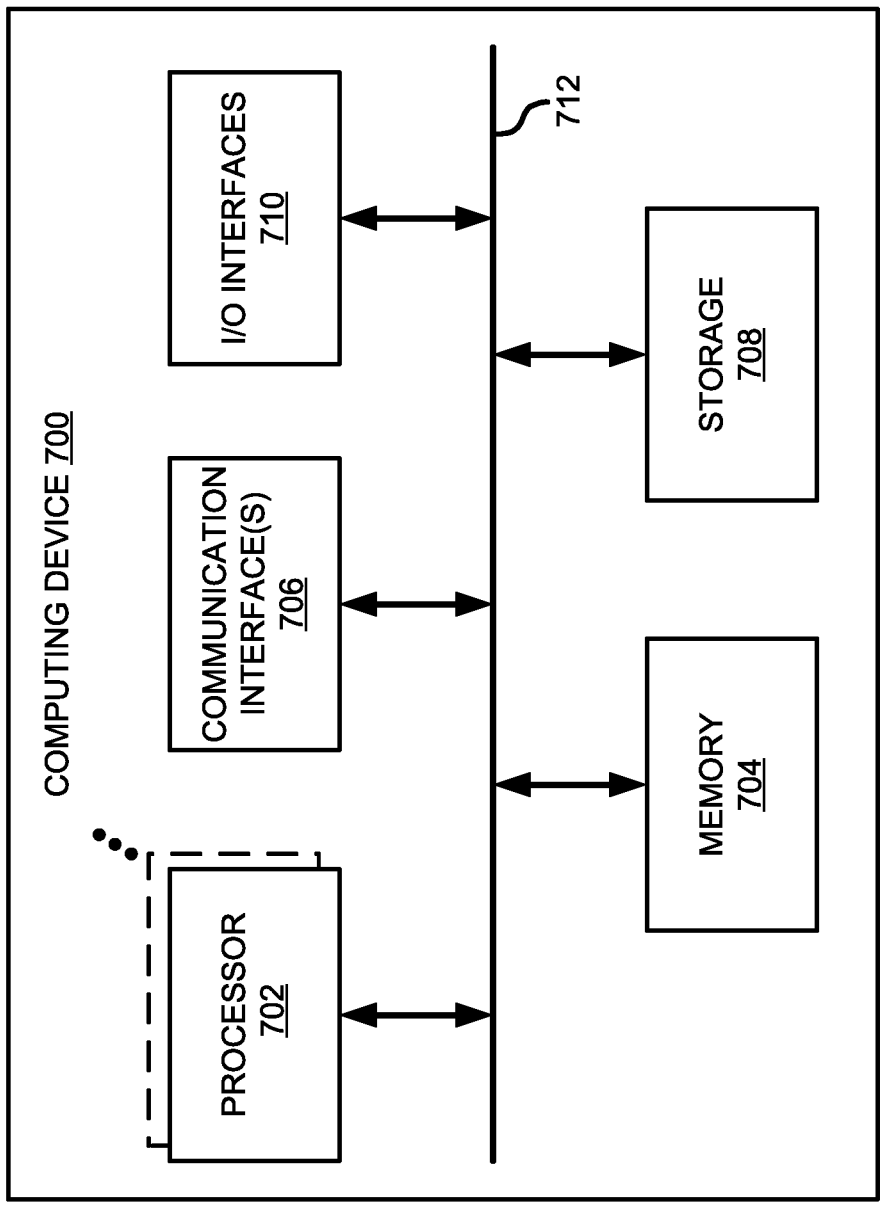
FIG. 7 illustrates a block diagram of an exemplary computing device, in accordance with embodiments of the present disclosure.

Having described an overview of embodiments of the present invention, an example operating environment in which some embodiments of the present invention are implemented is described below in order to provide a general context for various aspects of the present invention. Referring now to FIG. 7 in particular, an example operating environment for implementing embodiments of the present disclosure is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules (e.g., including or referencing routines, programs, objects, components, libraries, classes, variables, data structures, etc.) refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

FIG. 7 illustrates, in block diagram form, an exemplary computing device 700 that can be configured to perform one or more of the processes described above. One will appreciate that one or more computing devices such as the computing device 700 can implement the image processing system. As shown by FIG. 7, the computing device can include a processor 702, memory 704, one or more communication interfaces 706, a storage device 708, and one or more I/O devices/interfaces 710. In certain embodiments, the computing device 700 can include fewer or more components than those shown in FIG. 7. Components of computing device 700 shown in FIG. 7 will now be described in additional detail.

In particular embodiments, processor(s) 702 includes hardware for executing instructions, such as those making up a computer program. As an example, and not by way of limitation, to execute instructions, processor(s) 702 can retrieve (or fetch) the instructions from an internal register, an internal cache, memory 704, or a storage device 708 and decode and execute them. In various embodiments, the processor(s) 702 can include one or more central processing units (CPUs), graphics processing units (GPUs), field programmable gate arrays (FPGAs), systems on chip (SOC), or other processor (s) or combinations of processors.

The computing device 700 includes memory 704, which is coupled to the processor(s) 702. The memory 704 can be used for storing data, metadata, and programs for execution by the processor (s). The memory 704 can include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 704 can be internal or distributed memory.

The computing device 700 can further include one or more communication interfaces 006. A communication interface 706 can include hardware, software, or both. The communication interface 706 can provide one or more interfaces for communication (such as, for example, packet-based communication) between the computing device and one or more other computing devices 1100 or one or more networks. As an example, and not by way of limitation, communication interface 1106 can include a network interface controller ("NIC") or network adapter for communicating with an Ethernet or other wire-based network or a wireless NIC ("WNIC") or wireless adapter for communicating with a wireless network, such as a WI-FI. The computing device 700 can further include a bus 712. The bus 712 can comprise hardware, software, or both that couples components of computing device 700 to each other.

The computing device 700 includes a storage device 708 includes storage for storing data or instructions. As an example, and not by way of limitation, storage device 708 can comprise a non-transitory storage medium described above. The storage device 708 can include a hard disk drive ("HDD"), flash memory, a Universal Serial Bus ("USB") drive or a combination these or other storage devices. The computing device 700 also includes one or more input or output ("I/O") devices/interfaces 710, which are provided to allow a user to provide input to (such as user strokes), receive output from, and otherwise transfer data to and from the computing device 700. These I/O devices/interfaces 710 can include a mouse, keypad or a keyboard, a touch screen, camera, optical scanner, network interface, modem, other known I/O devices or a combination of such I/O devices/ interfaces 710. The touch screen can be activated with a stylus or a finger.

The I/O devices/interfaces 710 can include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 710 is configured to provide graphical data to a display for presentation to a user. The graphical data can be representative of one or more graphical user interfaces and/or any other graphical content as can serve a particular implementation.

Having identified various components in the present disclosure, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. A computer-implemented method comprising:
   accessing, by at least one server of one or more servers of a resource provisioning system of a computing environment for which manual provisioning is impractical due to a number of microservices in the computing environment, service resource information indicating computer resource usage of each of a plurality of microservices operating in the computing environment, the computing environment comprising a plurality of physical computer resources including central processing units (CPUs), memory devices, storage devices, and network interfaces;
   performing, by at least one server of the one or more servers of the resource provisioning system, a similarity analysis on the service resource information to generate similarity scores for each of the plurality of microservices;

ordering, by at least one server of the one or more servers of the resource provisioning system, the service resource information into a service order based on a closeness between the similarity scores of the microservices;

generating, by a reinforcement learning agent operating on at least one server of the one or more servers of the resource provisioning system, a resource configuration determination for at least one microservice of the plurality of microservices by the reinforcement learning agent processing the service resource information in the service order determined based on the similarity scores of the microservices;

providing the resource configuration determination to a provisioning component associated with the computing environment; and provisioning, by the provisioning component, a portion of the plurality of physical computer resources of the computing environment for the at least one microservice, the provisioning comprising automatically modifying the portion of the physical computer resources in accordance with the resource configuration determination, the modifying by the provisioning component including adjusting one or more of the CPUs, the memory devices, the storage devices, and/or the network interfaces of the computing environment.

2. The computer-implemented method of claim 1, wherein the reinforcement learning agent is a Thompson sampling-based multi-armed bandit agent.

3. The computer-implemented method of claim 1, wherein the similarity analysis applies a Dynamic Time Warping (DTW) similarity metric using Central Processing Unit (CPU) usage signals in a time-domain and a cosine similarity metric using the CPU usage signals in a frequency domain.

4. The computer-implemented method of claim 3, wherein the cosine similarity utilizes reward vectors to calculate a similarity metric of the microservices.

5. The computer-implemented method of claim 1, wherein the reinforcement learning agent learns a configuration-reward space through a domain-specific reward function.

6. The computer-implemented method of claim 1, wherein the reinforcement learning agent is a multi-armed bandit agent including predefined resource configurations as arms of the multi-armed bandit agent.

7. The computer-implemented method of claim 1, wherein a reward function to the reinforcement learning agent utilizes service performance of the microservices as a reward.

8. The computer-implemented method of claim 1, wherein a reward function for the reinforcement learning agent is based on utilization, overhead, and resource wastage metrics associated with the microservices.

9. The computer-implemented method of claim 1, wherein the reinforcement learning agent is penalized when a microservice of the microservices does not meet a predefined required performance constraint based on a number of times the microservice undergoes scaling relating to its usage and configuration.

10. The computer-implemented method of claim 1, wherein the service resource information includes workload states, resource usage, and resource configurations for each of the microservices operating in the computing environment.

11. A non-transitory computer readable storage medium including instructions stored thereon which, when executed by a processor, cause the processor to perform operations comprising:

accessing, by at least one server of one or more servers of a resource provisioning system of a computing environment for which manual provisioning is impractical due to a number of microservices in the computing environment, service resource information indicating computer resource usage of each of a plurality of microservices operating in the computing environment, the computing environment comprising a plurality of physical computer resources including central processing units (CPUs), memory devices, storage devices, and network interfaces;

performing, by at least one server of the one or more servers of the resource provisioning system, a similarity analysis on the service resource information to generate similarity scores for each of the plurality of microservices;

ordering, by at least one server of the one or more servers of the resource provisioning system, the service resource information into a service order based on a closeness between the similarity scores of the microservices;

generating, by a reinforcement learning agent operating on at least one server of the one or more servers of the resource provisioning system, a resource configuration determination for at least one microservice of the plurality of microservices by the reinforcement learning agent processing the service resource information in the service order determined based on the similarity scores of the microservices;

providing the resource configuration determination to a provisioning component associated with the computing environment; and provisioning, by the provisioning component, a portion of the plurality of physical computer resources of the computing environment for the at least one microservice, the provisioning comprising automatically modifying the portion of the physical computer resources in accordance with the resource configuration determination, the modifying by the provisioning component including adjusting one or more of the CPUs, the memory devices, the storage devices, and/or the network interfaces of the computing environment.

12. The non-transitory computer readable storage medium of claim 11, wherein the reinforcement learning agent is a Thompson sampling-based multi-armed bandit agent.

13. The non-transitory computer readable storage medium of claim 11, wherein the similarity analysis applies a Dynamic Time Warping (DTW) similarity metric using Central Processing Unit (CPU) usage signals in a time-domain and a cosine similarity metric using the CPU usage signals in a frequency domain.

14. The non-transitory computer readable storage medium of claim 13, wherein the cosine similarity is based on a cosine similarity of reward vectors of the microservices.

15. The non-transitory computer readable storage medium of claim 11, wherein the reinforcement learning agent learns a configuration-reward space through a domain-specific reward function.

16. The non-transitory computer readable storage medium of claim 11, wherein the reinforcement learning agent is a multi-armed bandit agent including predefined resource configurations as arms of the multi-armed bandit agent.

17. The non-transitory computer readable storage medium of claim 11, wherein a reward function to the reinforcement learning agent utilizes service performance of the microservices as a reward.

18. A system comprising:
one or more processors; and
one or more non-transitory computer storage media storing instructions that, when used by the one or more processors, cause the one or more processors to perform operations comprising:
requesting, by a provisioning component of a computing environment for which manual provisioning is impractical due to a number of microservices in the computing environment, resource configuration determinations for a plurality of microservices operating in the computing environment, the computing environment comprising a plurality of physical computer resources including central processing units (CPUs), memory devices, storage devices, and network interfaces;
receiving the resource configuration determinations based on the request, the resource configuration determinations having been generated by at least one server performing a similarity analysis on service resource information from the computing environment to generate similarity scores for the plurality of microservices, ordering the service resource information into a service order based on the similarity scores, and using a reinforcement learning agent to generate the resource configuration determinations using the service resource information in the service order determined based on the similarity scores of the microservices; and
provisioning, by the provisioning component, a portion of the plurality of physical computer resources of the computing environment for at least one microservice of the plurality of microservices, the provisioning comprising automatically modifying the portion of the physical computer resources in accordance with the resource configuration determinations, the modifying by the provisioning component including adjusting one or more of the CPUs, the memory devices, the storage devices, and/or the network interfaces of the computing environment.

19. The system of claim 18, further comprising:
analyzing a service form for a first microservice of the plurality of microservices associated;
editing a first resource configuration determination of the resource configuration determinations to produce an edited resource configuration based, at least in part, on the service form; and
provisioning at least one computer resource of the computing environment for the first microservice with the edited resource configuration.

20. The system of claim 18, wherein the reinforcement learning agent is penalized when a microservice does not meet a performance constraint including real-time performance monitoring, scalings, and resource wastage.

* * * * *